United States Patent
Homann et al.

(10) Patent No.: US 10,054,252 B2
(45) Date of Patent: Aug. 21, 2018

(54) DOUBLE-WALL PIPE WITH A HEAT INSULATING LAYER AND A PLASTIC OUTER PIPE THEREOF

(71) Applicant: Brugg Rohr AG Holding, Brugg (CH)

(72) Inventors: Joern Homann, Hannover (DE); Stephan Peters, Wunstorf (DE)

(73) Assignee: BRUGG ROHR AG HOLDING, Brugg (CH)

( * ) Notice: Subject to any disclaimer, the term of this patent is extended or adjusted under 35 U.S.C. 154(b) by 113 days.

(21) Appl. No.: 15/177,359

(22) Filed: Jun. 9, 2016

(65) Prior Publication Data
US 2016/0363251 A1    Dec. 15, 2016

(30) Foreign Application Priority Data

Jun. 11, 2015  (DE) .......................... 10 2015 109 313

(51) Int. Cl.

| | |
|---|---|
| *F16L 9/14* | (2006.01) |
| *F16L 59/14* | (2006.01) |
| *B32B 5/18* | (2006.01) |
| *B32B 7/12* | (2006.01) |
| *B32B 27/08* | (2006.01) |
| *B32B 27/36* | (2006.01) |

(Continued)

(52) U.S. Cl.
CPC .............. *F16L 59/143* (2013.01); *B32B 1/08* (2013.01); *B32B 5/18* (2013.01); *B32B 7/12* (2013.01); *B32B 27/065* (2013.01); *B32B 27/08* (2013.01); *B32B 27/306* (2013.01); *B32B 27/32* (2013.01); *B32B 27/36* (2013.01); *B32B 27/40* (2013.01); *F16L 9/121* (2013.01); *B32B 2266/0264* (2013.01); *B32B 2266/0278* (2013.01); *B32B 2266/08* (2013.01); *B32B 2307/304* (2013.01); *B32B 2307/554* (2013.01); *B32B 2307/72* (2013.01); *B32B 2307/724* (2013.01); *B32B 2307/732* (2013.01); *B32B 2597/00* (2013.01); *F16L 2011/047* (2013.01)

(58) Field of Classification Search
CPC ....................................................... F16L 9/14
USPC ...... 138/148, 149, 114, 141, 137; 428/36.91
See application file for complete search history.

(56) References Cited

U.S. PATENT DOCUMENTS

| | | | |
|---|---|---|---|
| 5,313,987 A | | 5/1994 | Rober et al. |
| 8,186,388 B2 * | | 5/2012 | Princell ..................... F16L 9/21 |
| | | | 138/137 |

(Continued)

FOREIGN PATENT DOCUMENTS

| | | |
|---|---|---|
| DE | 60303542 T2 | 11/2006 |
| DE | 202010018026 U1 | 12/2013 |

(Continued)

*Primary Examiner* — Patrick F Brinson
(74) *Attorney, Agent, or Firm* — Leydig, Voit & Mayer, Ltd.

(57) ABSTRACT

A double-wall pipe includes a media-conveying inner tube, and a multilayer plastics outer tube with a gas permeation barrier layer. The plastics outer tube includes a significant proportion of polyethylene (PE). The gas permeation barrier layer consists of a compact extruded polyethylene terephthalate (PET) layer having a material thickness of from 0.8 mm to 2 mm or comprises a closed-cell foam made from PET having a material thickness of between 10 mm and 100 mm. A heat insulating layer is arranged in an annular gap between the inner tube and the plastics outer tube.

9 Claims, 2 Drawing Sheets

(51) Int. Cl.
*B32B 27/40* (2006.01)
*B32B 1/08* (2006.01)
*F16L 9/12* (2006.01)
*B32B 27/06* (2006.01)
*B32B 27/30* (2006.01)
*B32B 27/32* (2006.01)
*F16L 11/04* (2006.01)

(56) References Cited

U.S. PATENT DOCUMENTS

| | | | |
|---|---|---|---|
| 2002/0006488 A1 | 1/2002 | Franosch et al. | |
| 2004/0040609 A1 | 3/2004 | Oishi et al. | |
| 2008/0072988 A1* | 3/2008 | Elgendy | F16L 58/1054 138/149 |
| 2008/0128042 A1 | 6/2008 | Seyler et al. | |
| 2010/0018601 A1* | 1/2010 | Princell | F16L 9/21 138/149 |
| 2010/0186846 A1* | 7/2010 | Carlay, II | F16L 11/045 138/137 |
| 2014/0366980 A1* | 12/2014 | Wardle | B32B 27/40 138/151 |

FOREIGN PATENT DOCUMENTS

| | | |
|---|---|---|
| EP | 0084088 A1 | 7/1983 |
| EP | 0569681 A1 | 11/1993 |
| EP | 0754897 A1 | 1/1997 |
| EP | 0836042 A2 | 4/1998 |
| EP | 0960723 B1 | 12/1999 |
| EP | 1288558 A1 | 3/2003 |
| EP | 1394457 B1 | 3/2004 |
| EP | 1471299 A1 | 10/2004 |
| WO | WO 2004003423 A1 | 11/2004 |

* cited by examiner

DOUBLE-WALL PIPE WITH A HEAT INSULATING LAYER AND A PLASTIC OUTER PIPE THEREOF

CROSS-REFERENCE TO PRIOR APPLICATION

Priority is claimed to German Patent Application No. DE 10 2015 109 313.8, filed on Jun. 11, 2015, the entire disclosure of which is hereby incorporated by reference herein.

FIELD

The invention relates to a double-wall pipe comprising a media-conveying inner tube, a plastics outer tube and a gas permeation barrier layer, a thermal heat insulating layer being arranged in an annular gap between the inner tube and the plastics outer tube, and the plastics outer tube having a significant proportion of polyethylene and/or comprising a polyethylene layer. The invention also relates to a plastics outer tube intended for a pipe, said outer tube having a significant proportion of polyethylene and/or comprising a polyethylene layer, the gas permeation barrier layer comprising a significant proportion of polyethylene terephthalate (PET).

BACKGROUND

Such double-wall pipes are used in district heating pipes, for example. The diameter of the plastics outer tube in such cases is generally between 75 mm and 1,200 mm, although larger diameters are also possible.

The pipes consist of an inner tube that conveys media when in use and is usually made from steel, although other materials can also be used. For thermal insulation, the medium pipe is surrounded by a heat insulating layer for insulation purposes, said layer usually being a rigid foam. A plastics outer tube representing a mechanical protective jacket and often consisting of polyethylene forms the outer seal.

The adhesive bond of such a sandwich system is very important for the purpose of pipe statics in the case of hot pipes laid underground, as all thermal forces are transmitted in a frictional manner. In such cases, it is particularly important that the insulation provided for heat insulation purposes fulfills its function fully over a long period of time.

However, in practice, it has been found that such heat insulating layers, in particular rigid foam insulation, specifically those made from polyurethane foam, are subject to an increasing ageing process, especially if the media are at high temperatures in excess of approximately 120° C. This not only has an adverse effect on the heat insulation value, but also on the mechanical adhesive bond.

The ageing behavior is due in particular to the gases penetrating the plastics outer tube, particularly oxygen. The penetrating oxygen leads to oxidation processes within the insulation which cause the properties of the insulation to deteriorate. The $CO_2$ bonded in the pores is diffused outwards and replaced by nitrogen from the atmosphere, leading in turn to a deterioration of the insulating effect.

The above-mentioned problems occur in particular in the rigid polyurethane foams used as insulation. Decomposition due to oxidation leads to destruction of the "cell windows" in the polyurethane foam. This results in a reduction in the compressive strength and in the ability of the foam to withstand shear stress until mechanical failure of the system.

WO 2004/003423 A1 describes an insulated pipe comprising one or more inner tubes and an insulating foam surrounding the inner tube. The pipe has a layer that regulates diffusion, said layer being applied to the outer face of the foam. Furthermore, the pipe may comprise an outer tube made from a durable material, preferably polyethylene. The diffusion-regulating layer may be arranged between the polyethylene outer tube and the polyurethane foam or on the outer face of the polyethylene outer tube.

If the diffusion-regulating layer is arranged on the outer face of the outer tube, there is a risk that this layer may be damaged or destroyed by mechanical effects. Arranging the diffusion-regulating layer between the outer tube and the polyurethane foam also has disadvantages because the inner tube (steel tube) or the spacer guiding the inner tube comes into contact with the diffusion-regulating layer during manufacture of the pipe when inserting the inner tube into the outer tube by manual means or by machine, and may damage or destroy said diffusion-regulating layer if it is only very thin and designed such that it can be mechanically damaged.

Pipes comprising a stainless steel tube as a medium pipe, an insulating layer made from polyisocyanurate foam (PIR), a gas permeation barrier layer and a low-density polyethylene (LDPE) jacket are already known.

DE 20 2010 018 026 U1 relates to a plastics outer tube for a plastics jacketed pipe which comprises a medium pipe, particularly made from steel, a plastics outer tube acting as a mechanical protective jacket, and insulation filling the annular gap between the medium pipe and the outer tube to provide thermal insulation. In this case the plastics outer tube is designed as a multilayer tube and comprises a plastics gas permeation barrier layer consisting of ethylene vinyl alcohol copolymer (EVOH) in the inside thereof, integrated in the outer tube. An inner and an outer adhesion-promoting layer are provided adjacently to the gas permeation barrier layer. The plastics outer tube consists of an inner polyethylene layer, an inner adhesion-promoting layer of the gas permeation barrier layer made from EVOH that is adjacent to said inner polyethylene layer, an outer adhesion-promoting layer that is adjacent to said inner adhesion-promoting layer, and an outer polyethylene layer. The gas diffusion barrier layer is 100 μm thick, whereas the entire plastics outer tube is 3 mm thick.

Flexible composite pipes for district heating pipes are also already known that are formed of an inner and an outer corrugated pipe having polyurethane foam heat insulation arranged between said pipes and are able to be rolled up on reels.

It is therefore already known to provide a gas permeation barrier layer on such pipes or plastics outer tubes in order to prevent the outside atmosphere, and in particular oxygen, coming into contact with the inner foam layer and causing or accelerating the ageing thereof.

EP 1 471 299 A1 describes a thermally insulated pipe comprising at least one inner tube, a heat insulating layer, and an outer jacket made from thermoplastic material, a thermoformable plastics film being provided in said pipe between the heat insulating layer and the outer jacket. The plastics film has a core layer, for example made of polyethylene terephthalate having a material thickness of 14 μm, and two boundary layers bonded by adhesion-promoting layers.

EP 0 569 681 A1, EP 0 836 042 A1 and US 2008/0128042 A1 also describe the use of polyethylene terephthalate as a material for gas permeation barrier layers in multilayer tube configurations.

EP 0 960 723 B1 also relates to a composite element, for example for the packaging industry, having a layer sequence consisting of polyethylene, aluminum and polyethylene terephthalate, and EP 1 394 457 B1 relates to a hose having low permeation, comprising at least one coolant barrier layer and a rubber layer or a resin layer, polyethylene terephthalates preferably being used as polyester resins.

SUMMARY

In an embodiment, the present invention provides a double-wall pipe including a media-conveying inner tube, and a multilayer plastics outer tube with a gas permeation barrier layer. The plastics outer tube includes a significant proportion of polyethylene (PE). The gas permeation barrier layer consists of a compact extruded polyethylene terephthalate (PET) layer having a material thickness of from 0.8 mm to 2 mm or comprises a closed-cell foam made from PET having a material thickness of between 10 mm and 100 mm. A heat insulating layer is arranged in an annular gap between the inner tube and the plastics outer tube.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
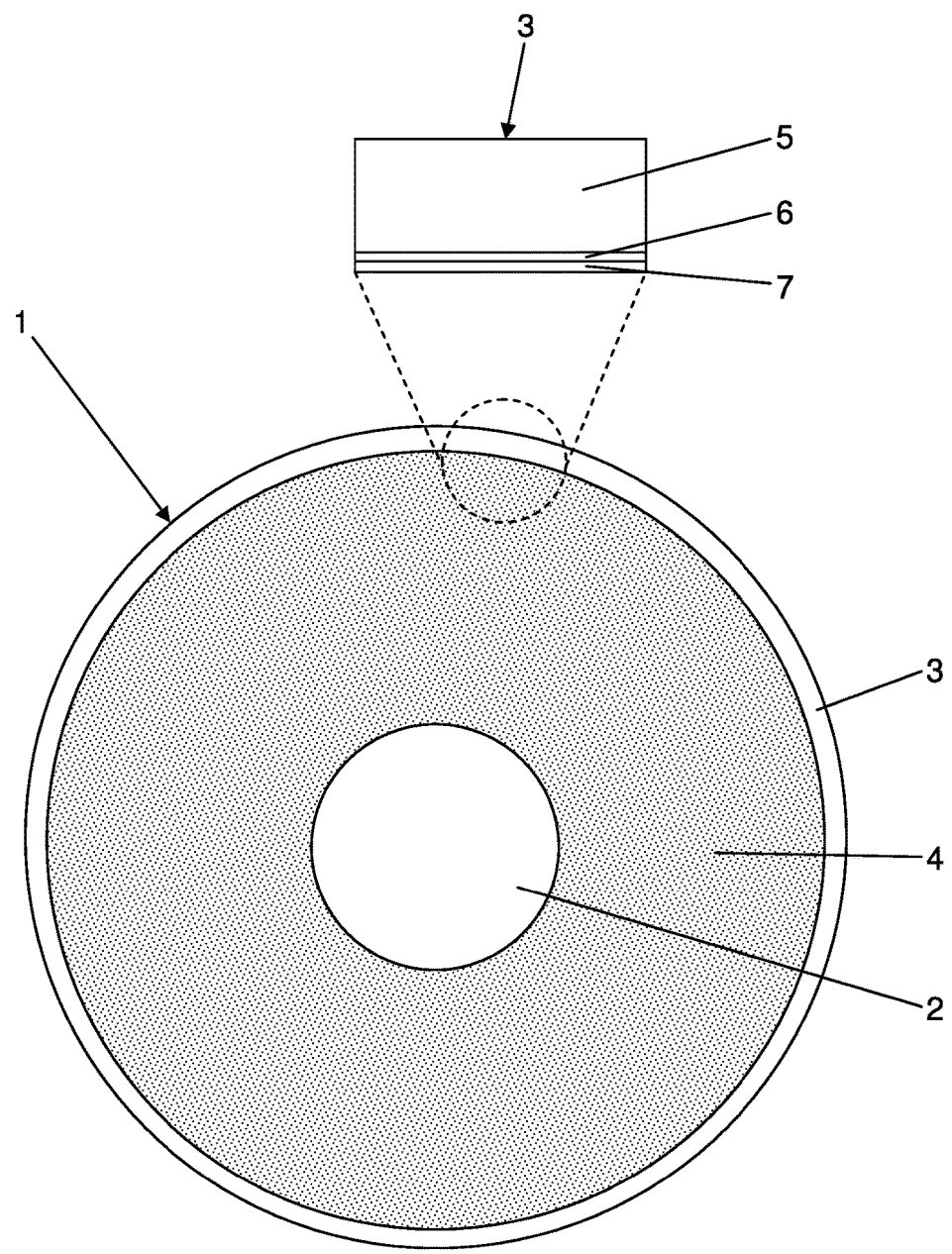
FIG. 1 shows a first embodiment comprising a plastics outer tube designed as a multilayer tube.

The high costs associated with using an EVOH gas permeation barrier layer have proved to be disadvantageous. Although LDPE, which is available at a low cost, is in principle also suitable as a gas permeation barrier layer, the necessary material thickness is approximately 3,000 times greater than when using EVOH, which leads to considerable restrictions in practice.

In an embodiment, the invention provides a cost-effective and also highly efficient gas permeation barrier layer for a pipe. In another embodiment, the invention provides a plastics outer tube intended for a pipe.

According to an embodiment of the invention, a pipe is provided in which the plastics outer tube is designed as a multilayer tube comprising a gas permeation barrier layer made from a compact extruded polyethylene terephthalate layer having a material thickness of from 0.8 mm to 2 mm, and in particular 0.8 mm to 1 mm, or in which the gas permeation barrier layer comprises a closed cell foam made from polyethylene terephthalate having a material thickness of between 10 mm and 100 mm. This makes it possible to prevent gas exchange in the insulation of a plastics jacketed pipe, especially in the foam system, or to reduce said gas exchange to such an extent that the properties of said insulation are substantially maintained over the service life of the plastics jacketed pipe. This ensures that the effects of ageing insulation as observed in the prior art can be significantly reduced. In particular, it is possible to avoid a reduction in the heat insulation value. Polyethylene terephthalate (PET) is a material that is available at a low cost, and has significantly reduced gas permeability compared to LDPE as a gas permeation barrier layer. This thus prevents the oxygen that leads to ageing from penetrating the plastics outer tube and accessing the insulation or the foam system of a plastics jacketed pipe, and as a result substantially prevents ageing of the foam due to gas diffusion while maintaining a virtually constant insulating effect. The mechanical characteristics of the foam are maintained. The existing adhesive bond is guaranteed. This creates a closed permeation-proof system, which means that higher temperatures are possible on a permanent basis without reducing the service life of the plastics jacketed pipes. At the same time, the heat insulation value of the pipe is maintained over the pipe's lifecycle due to the fact that cell gas exchange is more or less ruled out.

The outside of the proposed gas permeation barrier layer is surrounded by a material layer of the plastics outer tube, with the result that the gas permeation barrier layer is protected from external damage. In particular, although there is some contact between the inner tube and/or the spacers guiding the inner tube and the gas permeation barrier layer while the medium pipe or inner tube is inserted into the outer tube, the material is so wear-resistant that no significant damage is possible.

The fact that the plastics outer tube is manufactured as a multilayer tube together with the gas permeation barrier layer, using the co-extrusion method for example, leads to a compact PET layer having a material thickness of preferably less than 2 mm, for example 0.8 mm to 1 mm, it still being possible to provide an adhesion-promoting layer between the plastics outer tube and the gas permeation barrier layer.

If the gas permeation barrier layer is formed by a closed-cell foam made from PET having a material thickness of between 10 mm and 100 mm, the PET closed-cell foam also acts advantageously as a heat insulating layer. The manufacturing process is considerably simplified by the fact that the gas permeation barrier layer is also formed as an insulating layer in the annular gap between the plastics outer tube and the inner tube. It has been found that the walls of the foam pores effectively reduce the gas permeability such that they can ultimately be used effectively between the inner tube and the plastics outer tube as a gas permeation barrier layer. Almost any material suitable for pipes can thus be used as a plastics outer tube because a coating is no longer necessary.

A particularly advantageous embodiment of the invention is achieved in this case by bonding the gas permeation barrier layer to the plastics outer tube by means of at least one adhesion-promoting layer to form one unit. By bonding the plastics outer tube to the gas permeation barrier layer to form one structural unit, further manufacture of the double-wall pipe can be simplified particularly advantageously. In particular, the gas permeation barrier layer is therefore not introduced into the annular gap between the plastics outer tube and the inner tube as a separate layer or film, but instead the pipe can be finished by simply foaming the annular gap, thus further reducing manufacturing costs. An additional adhesion-promoting layer and a wear-resistant layer can be used on the inside of the gas permeation barrier layer, but this is not necessary for standard applications.

The gas permeation barrier layer could be arranged on the plastics outer tube, protected between two cover layers, and integrally bonded to said tube. However, it is particularly advantageous if the gas permeation barrier layer is arranged on an inner face of the plastics outer tube facing the inner tube. Due to the high mechanical loading capacity of the polyethylene terephthalate (PET) gas permeation barrier layer, said layer can also easily be formed as an inner wall surface of the composite element thus formed from the plastics outer tube and the gas permeation barrier layer.

In this case, the PET is converted to a cellular state by adding auxiliary materials and foaming agents during the extrusion process, resulting in a further improvement in the insulating properties of the pipe system. The density of the cellular PET is between 60 and 300 kg/m$^3$ in this case, and preferably 80 kg/m$^3$. In particular, the cellular PET will have more than 70% closed cells in this case.

The gas permeation barrier layer is preferably arranged on the inside in the plastics outer tube. Such a position is preferred in order to achieve adequate material coverage of the gas permeation barrier layer towards the outside. The material for the gas permeation barrier layer is selected such that it is sufficiently stable and wear-resistant to avoid the risk of the inner tube touching the plastics outer tube while the inner tube is being inserted in the plastics outer tube during manufacture of the pipe and thus damaging the gas permeation barrier layer produced. This is achieved by the density of the cellular PET being at least 80 kg/m$^3$ and having a closed or compact inner boundary layer. A corresponding material coverage towards the outside is advantageous in order to prevent damage to the gas permeation barrier layer by external forces.

In another embodiment which is also particularly suitable for practical applications, the heat insulating layer is made from polyurethane foam and can be manufactured cost-effectively as a result. In a plastics outer tube designed as a multilayer tube, such a heat insulating layer is preferably used together with a gas permeation barrier layer made from a compact PET layer which is at least 0.8 mm thick.

For this purpose, the components forming the heat insulating layer are preferably supplied in liquid form and only foamed to form closed-cell foam in the annular gap, thus making it possible to further simplify the manufacturing process.

The plastics outer tube may be made from a polyethylene material for standard application purposes. However, it is particularly useful if the plastics outer tube also comprises at least one outer layer made from polyethylene having a density of more than 0.94 g/cm$^3$ and thus very low gas permeability in conjunction with the gas permeation barrier layer.

The plastics outer tube comprising the gas permeation layer can be extruded in one or more steps. The plastics outer tube is preferably manufactured by co-extruding all layers. Expediently, a pipehead comprising three extruders is used for this purpose, which pipehead co-extrudes the gas diffusion barrier layer, the adhesion-promoting layer and an outer layer.

The invention is not restricted to specific dimensions. Nevertheless, for use in pipes in district heating networks, it has been found to be expedient in practice to have dimensions whereby a pipe diameter is between 75 mm and 1,200 mm, with the result that a gas permeation barrier layer manufactured using closed-cell PET foam will have an adequate material thickness which may even exceed the efficiency of a gas permeation barrier layer consisting of EVOH.

In another embodiment, the invention provides a plastics outer tube intended for a pipe comprising a significant proportion of polyethylene, and in particular polyethylene having a density of more than 0.94 g/cm$^3$. The plastics outer tube is designed as a multilayer tube comprising a gas permeation barrier layer produced from a compact (extruded) polyethylene terephthalate layer. For this purpose, the plastics outer tube is manufactured as a multilayer tube together with the gas permeation barrier layer, using the co-extrusion method for example, resulting in a compact PET layer having a material thickness of preferably less than 2 mm, for example 0.8 mm to 1 mm. The plastics outer tube thus produced is suitable for many applications, in particular in double-wall pipes in conjunction with almost any insulating materials as a result of the low gas permeability which can be thus achieved.

There are many possible embodiments of the invention. To further clarify a fundamental principle thereof, the drawings show an example of one of these embodiments, which is then described below. The drawings are each a schematic view of a double-wall pipe.

FIG. 1 shows a double-wall pipe 1 according to an embodiment of the invention comprising a media-conveying inner tube 2 and a plastics outer tube 3. A thermal heat insulating layer 4 made from polyurethane foam is arranged in an annular gap between the inner tube 2 and the plastics outer tube 3. In this case, the plastics outer tube 3 is designed as a multilayer tube which has an outer layer 5 made from high-density polyethylene (HDPE) and has a thickness of 3 mm, for example, an adhesion-promoting layer 6 having a thickness of approximately 0.01 mm, and a compact extruded polyethylene terephthalate layer as a gas permeation barrier layer 7 having a material thickness between 0.8 mm and 1 mm. In this case, the polyethylene terephthalate layer serves as a gas permeation barrier layer 7 which is both highly efficient and cost-effective.

Figure 2:
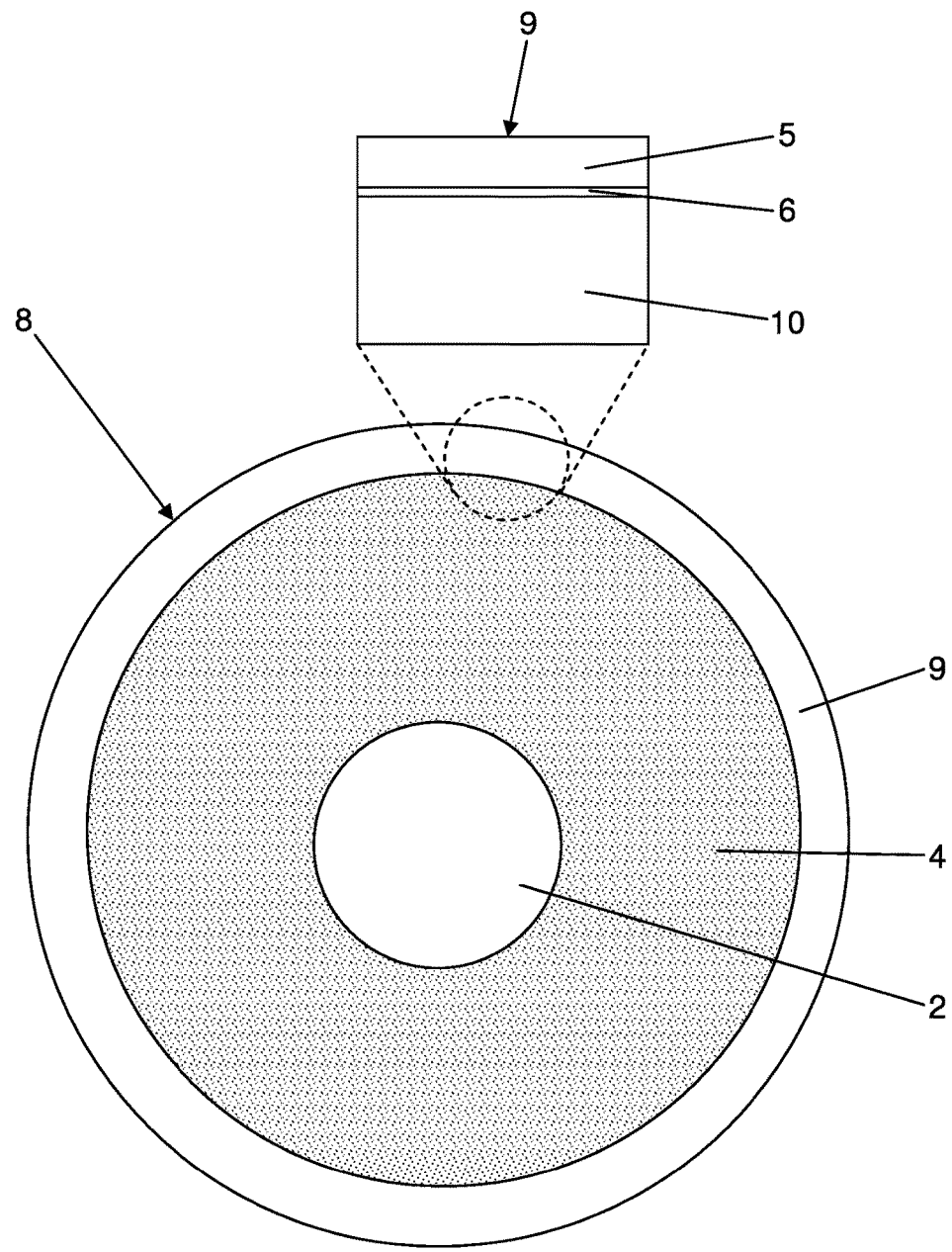
FIG. 2 shows a second embodiment comprising a gas permeation barrier layer formed by a closed-cell foam.

In another embodiment of a pipe 8 illustrated in FIG. 2, a plastics outer tube 9 is also designed as a multilayer tube comprising an outer layer 5 made from polyethylene (HDPE), an adhesion-promoting layer 6, and a gas permeation barrier layer 10. Unlike the variant illustrated in FIG. 1, the gas permeation barrier layer 10 is formed by a closed-cell foam made from polyethylene terephthalate (PET) having a material thickness of approximately 10 mm. This means that the closed-cell foam in the gas permeation barrier layer 10 can also fulfill a thermal and mechanical insulating function in addition to the heat insulating layer 4 made from polyurethane foam.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 pipe
2 inner tube
3 plastics outer tube
4 heat insulating layer
5 outer layer
6 adhesion-promoting layer
7 gas permeation barrier layer
8 pipe
9 plastics outer tube
10 gas permeation barrier layer

The invention claimed is:

1. A double-wall pipe comprising:
a media-conveying inner tube,
a multilayer plastics outer tube with a gas permeation barrier layer, the plastics outer tube comprising polyethylene (PE), the gas permeation barrier layer contactingly bonded to the outer tube, the gas permeation barrier layer consisting of a compact extruded polyethylene terephthalate (PET) layer having a material thickness of from 0.8 mm to 2 mm or comprising a closed-cell foam made from PET having a material thickness of between 10 mm and 100 mm, and
a heat insulating layer arranged in an annular gap between the inner tube and the gas permeation barrier layer of the plastics outer tube.

2. The pipe according to claim 1, wherein the gas permeation barrier layer is bonded to the plastics outer tube using at least one adhesion-promoting layer to form one unit.

3. The pipe according to claim 1, wherein the gas permeation barrier layer is arranged on an inner face of the plastics outer tube facing the inner tube.

4. The pipe according to claim 1, wherein the heat insulating layer is made from polyurethane foam (PUR).

5. The pipe according to claim 1, wherein components forming the heat insulating layer are foamable into the annular gap to form the closed-cell foam.

6. The pipe according to claim 1, wherein the plastics outer tube comprises at least one outer layer made from polyethylene (HDPE) having a density >0.94 g/cm$^3$.

7. The pipe according to claim 1, wherein the pipe has a diameter of between 75 mm and 1,200 mm.

8. A plastics outer tube for a double-wall pipe, the plastics outer tube comprising a significant proportion of polyethylene (PE) and being a multilayer tube comprising a gas permeation barrier layer made from a compact or cellular polyethylene terephthalate (PET) layer.

9. The pipe according to claim 1, wherein the compact extruded PET layer has a material thickness of from 0.8 mm to 1 mm.

* * * * *